United States Patent [19]

Dean, Jr. et al.

[11] Patent Number: 4,630,397
[45] Date of Patent: Dec. 23, 1986

[54] DRUM AND CABLE MECHANISMS FOR OPENING/CLOSING GREENHOUSE VENT

[75] Inventors: George J. Dean, Jr.; Robert S. Klaeser, both of Arvada; Lloyd W. Braa, Lakewood, all of Colo.

[73] Assignee: Roper Corporation, Kankakee, Ill.

[21] Appl. No.: 738,559

[22] Filed: May 28, 1985

[51] Int. Cl.⁴ ............................................. E05C 7/06
[52] U.S. Cl. ........................................ 49/97; 49/342; 49/336
[58] Field of Search ................ 49/356, 331, 332, 341, 49/342, 344, 345, 340, 97; 74/89.2, 89.22

[56] References Cited

U.S. PATENT DOCUMENTS

| | | | |
|---|---|---|---|
| 1,338,671 | 5/1920 | Burnham | 49/342 X |
| 3,003,357 | 10/1961 | Votta, Jr. | 74/89.2 |
| 4,507,044 | 3/1985 | Hutchins et al. | 74/89.22 X |

*Primary Examiner*—Kenneth Downey
*Attorney, Agent, or Firm*—Leydig, Voit & Mayer

[57] ABSTRACT

A control mechanism for opening and closing a window sash or like element pivotally mounted in a frame. The mechanism has a drive member mounted for rotation with an elongated drive shaft and a housing mounted on the drive member for rotation relative to the drive member and the elongated shaft. The housing includes a retaining mechanism which is subtended by a first portion of the drive member. A rod for reciprocating movement in response to rotation of the drive member is located between the retaining mechanism and the first portion of the drive member and held in direct contact with the drive member by the retaining mechanism. The rod has a first end attached to the window sash and also has cables connecting it to the drive member such that rotation of the drive member in a first direction causes longitudinal movement of the rod in a first direction, thereby opening the window, and rotation of the drive member in a second direction causes longitudinal movement of the rod in a second direction, thereby closing the window.

23 Claims, 7 Drawing Figures

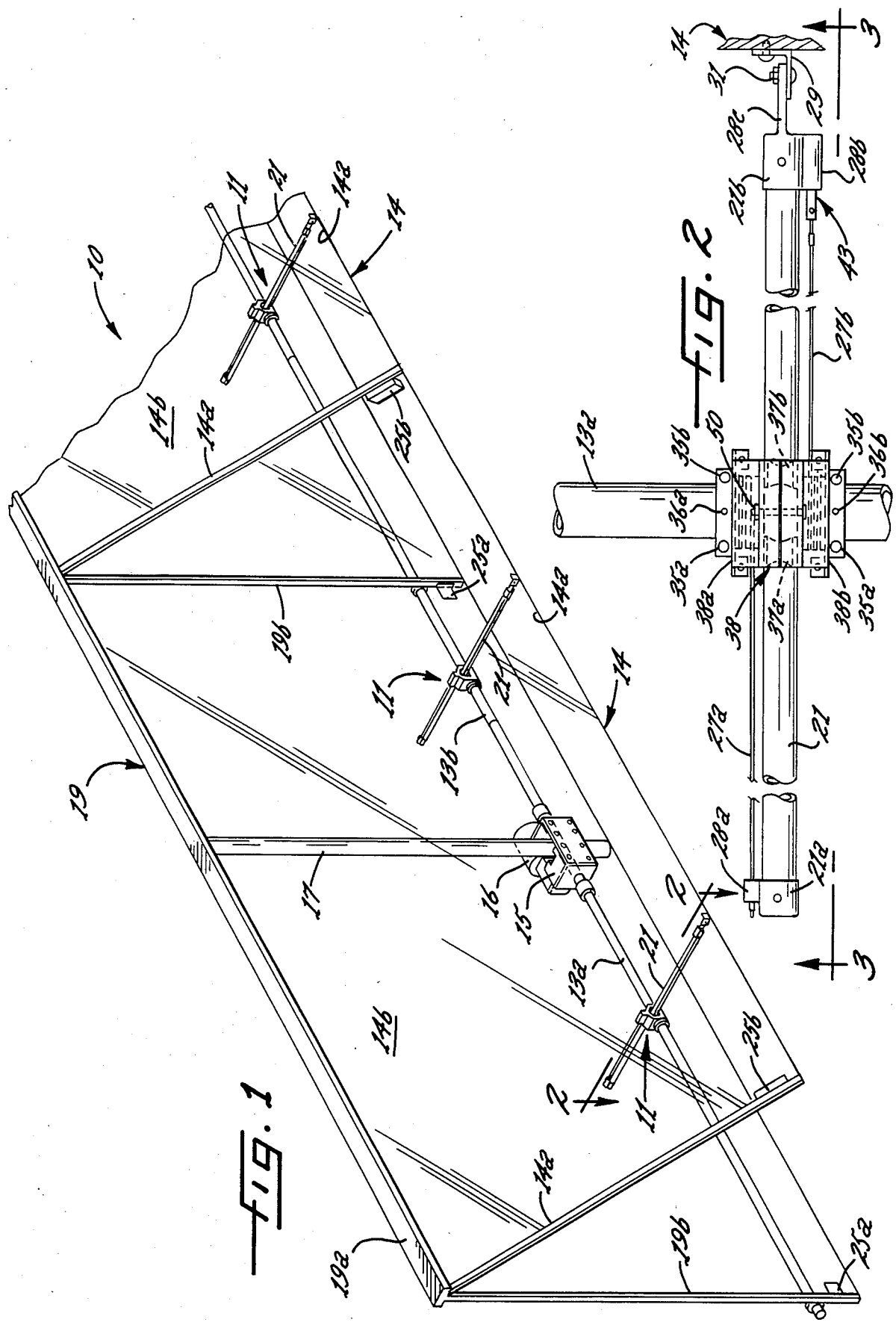

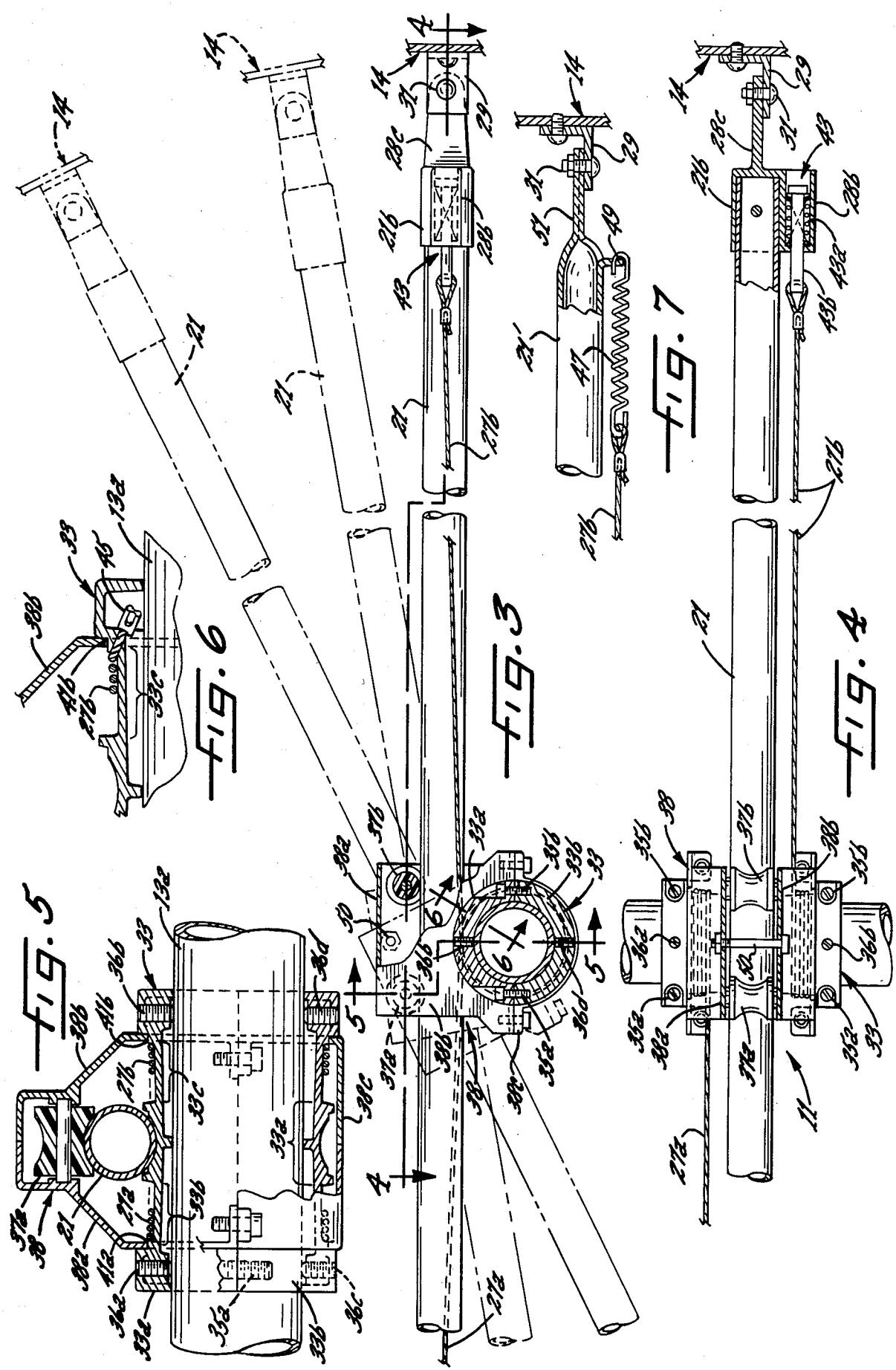

4,630,397

DRUM AND CABLE MECHANISMS FOR OPENING/CLOSING GREENHOUSE VENT

DESCRIPTION OF THE INVENTION

This invention generally relates to an apparatus for imparting reciprocating movement to a driven member from the rotational movement of a drive member and, more particularly, to an improved apparatus for opening and closing hinged windows, vents or the like.

Some buildings, such as greenhouses, have hinged windows or vents located in areas which are not easily accessible. Where they are accessible, the large number of windows may make it inconvenient to operate them individually. Over the years, many mechanisms have been developed to cope with the inconvenience or non-accessibility posed by the location or number of these windows. Typically, these mechanisms include relatively complex mechanical linkages since the motion of a prime mover (most likely rotary motion) must be transformed to a reciprocating motion for opening and closing hinged windows. In order to make these mechanisms less expensive, gears and other parts requiring machining have been successfully eliminated in prior mechanisms. But, these mechanisms still retain a construction which is relatively complex and, therefore, subject to expensive assembly procedures.

In view of the foregoing, it is a general object of the invention to provide an improved apparatus for imparting reciprocating movement to open and close windows or vents wherein the apparatus is simplified in construction. In this connection, it is a related object of the invention to provide an improved apparatus for imparting reciprocating movement to open and close windows or vents which is adapted for reliable operation and requires limited maintenance.

Other objects and advantages of the invention will become apparent upon reading the following detailed description and upon reference to the drawings, in which:

FIG. 1 is an elevated perspective view of a pivotable window assembly having a plurality of control mechanisms mounted on an elongated drive shaft according to the invention for reciprocating rods between window opening and closing positions;

FIG. 2 is an enlarged plan view of one of the control mechanisms in FIG. 1 taken in the plane of line 2—2 in FIG. 1 and showing cables connecting the opposite ends of the reciprocating rod to a drive member coaxially mounted on the elongated drive shaft;

FIG. 3 is an enlarged partial sectional side view of the control mechanism taken in the plane of line 3—3 in FIG. 2 and showing the mechanism in three progressive positions in accommodating movement of the reciprocating rod as it follows the arc swept by the pivoting window;

FIG. 4 is a partial sectional plan view of the control mechanism taken in the plane of line 4—4 in FIG. 3 and showing a retaining member for biasing the reciprocating rod against the drive member and also showing anchoring means connecting one end of a cable to the end of the reciprocating rod;

FIG. 5 is an enlarged sectional view of the control mechanism according to the invention taken in the plane of line 5—5 in FIG. 3;

FIG. 6 is an enlarged segment of the cross-sectional view in FIG. 5 detailing a means for anchoring an end of the cable to the drive member of the mechanism according to the invention; and FIG. 7 is a partial sectional plan view of an alternative embodiment for joining the end of the cable, shown in FIG. 4, to the end of the reciprocating rod.

While the invention will be described in connection with a preferred embodiment, it will be understood that it is not intended to limit the invention to a particular embodiment. On the contrary, it is intended to cover all alternatives and equivalents as may be included within the spirit and scope of the invention.

Referring more particularly to FIG. 1 of the drawings, there is shown a window assembly 10 which includes a frame 19 and a plurality of interconnected windows 14 pivotably secured thereto, each window 14 in the case being former by a sash 14a and a pane 14b. For opening and closing the windows, a reversible electric motor 16 is provided for driving a transmission 15 of a known type, which in turn drives a pair of elongated shafts 13a, 13b extending in coaxial relation on opposed sides of the transmission 15. The elongated shafts 13a, 13b each carry and operate a plurality of window control mechanisms 11. For supporting the transmission 15 and the electric motor 16, an elongated outrigger 17 is secured in depending fashion from a top portion 19a of a fixed window frame 19. The frame 19 further includes vertical members 19b that support the elongated shafts 13a, 13b for relative rotational movement.

Each control mechanism 11 includes a reciprocating rod 21 that is moveable between first and second positions for opening and closing, respectively, the windows 14. A first end of the rod 21 is pivotably connected to the free end of the window in order to permit movement of the window between its closed and opened positions in response to the reciprocating motion of the rod 21. As will be explained more fully hereinafter, the control mechanisms 11 each respond to clockwise and counterclockwise rotational movement of the shafts 13a, 13b to move its rod 21 along its longitudinal axis in first and second directions, respectively. As the rod 21 moves to the left (as viewed in FIG. 2), the window 14 pivots toward a closed position. In order to stop further movement of the rod 21 when the window 14 is fully closed, mating strike plates 25a, 25b are located on the frame 19 and window sash 14a, respectively, and positioned such that the strike plates come into contact with one another when the window 14 reaches a fully closed position with respect to the frame. In response to the contacting of the strike plates 25a, 25b, power to the electric motor 19 can be cut off in a known manner, such as by limit switch means, thereby preventing further operation of the control mechanism 11 which may damage the window 14.

To facilitate reciprocating movement of the rod 21 in response to the clockwise and counterclockwise movement of the shafts 13a and 13b, cables 27a, 27b each are anchored at one of their ends to respective outriggers 28a, 28b extending from end caps 21a, 21b at opposed ends of the rod 21. The end cap 21b in this case also includes an outrigger 28c coupled to an L-bracket 29 for pivotably connecting the rod 21 to the window. A nut and bolt assembly 31 function as a pivot pin to allow movement of the rod with respect to the window 14 as the window pivots about the frame 19.

Each control mechanism 11 further includes a drive member 33 (FIG. 3), about which the opposite ends of the cable 27a, 27b are wound in opposing directions such that rotation of the drive member 33 with its respective shaft 13a, 13b in a clockwise direction causes the cable 27a to be taken up and the cable 27b to be let out. Upon rotation of the drive member 33 and shafts 13a, 13b in a counterclockwise direction, the winding and unwinding of the cables 27a, 27b are reversed. Hence, depending upon the direction of rotation of the shafts 13a, 13b, either the cable 27a or 27b can be caused to draw the rod 21 along its longitudinal axis.

In accordance with the invention, the drive member of each control mechanism has a two part cylindrical construction and is concentrically mounted on the drive shaft so as to lend itself to easy manufacture and reliable operation. To this end, the drive member 33 is composed of two half cylinders 33a, 33b joined by screws 35a, 35b for enabling the opposing half cylinders 33a, 33b to be coupled to the drive shafts 13a, 13b without removing the drive shaft from its mounting on the frame 19. (FIGS. 3 and 4) Diametrically opposing set screws 36a–36d (as best seen in FIG. 5) in this instance fixedly secure the assembled drive member 33 to its respective rotating shaft 13a, 13b so that the member rotates with the shaft.

In accordance with a further aspect of the invention, the reciprocating rod 21 of each control mechanism rides on a surface of the cylindrical drive member 33 such that upon rotation of the drive member 33 the rod is moved transversely with respect to the axis of rotation for the drive shafts 13a or 13b. In order to maintain the rod 21 in contact with the cylindrical drive member 33, a housing 38 rotatably mounted on the drive member 33 includes a retaining mechanism comprising plastic rollers 37a and 37b mounted in the housing for bearing on the rod and holding it against the drive member. By rotating about an axis parallel to the axis of rotation for the shafts 13a, 13b, the rollers 37a, 37b reduce frictional contact between the rod 21 and the retaining mechanism. In order that the control mechanism 11 may be mounted on the rotating shafts 13a, 13b at locations intermediate other mechanisms 11 without requiring the other mechanisms to be removed or disturbed, the housing 38 is comprised of two top sections 38a, 38b disposed on opposite sides of the drive shafts 13a, 13b and a bottom section 38c coupling together the undersides of the sections 38a, 38b.

For securing together the top sides of the housing sections 38a, 38b with the plastic rollers 37a, 37b disposed in proper relation on the respective shaft 13a, 13b, a nut and bolt assembly 50, best shown in FIG. 4, is secured between upstanding portions of the sections 38a, 38b. Bottom section 38c is secured to assembled sections 38a and 38b by bolts 38d (FIG. 3) whereby the housing 38 is assembled around drive member 33 and is rotatable thereon. In such assembled condition, as the drive member 33 is rotated, the retaining mechanism, comprising the rollers 37a, 37b hold the rod 21 in contact with the rotating drive member 33, while allowing the rod to move transversely to the axis of the drive member by virtue of the winding and unwinding action of the cables 27a, 27b.

As indicated by the alternative positions of the control mechanism 11 shown in FIG. 3, since the pivoting of the window 14 causes the free end of the window sash to sweep a circular arc, the end of the rod 21 secured to the window must be free to move with the end of the window. In order to allow the end of the rod 21 to follow the arcuate path of the window, the housing 38 rests on bearing surfaces 41a, 41b of drive member 33, as best seen in FIG. 5, which allow the housing 38 and the associated retaining mechanism to rotate relative to the drive member 33.

As the drive member 33 rotates with shafts 13a, 13b, the cables 27a, 27b are wound or unwound about drive member 33. In order to prevent over tensioning or slack in the cables 27a, 27b, a spring and plunger assembly 43, as seen in FIG. 4, is received by a bore in the outrigger 28b. In addition, the spring and plunger assembly 43 prevents over-stressing of components in response to slight misadjustment between closed positions of adjacent windows or vents operated on a common drive shaft. For example, if one window reaches its closed position slightly before an adjacent window reaches its closed position, the additional take-up of the cable of the first window can be accommodated by the spring so as to avoid possible damage to the mechanism. Although a spring and plunger assembly 43 is shown on the window end of rod 21, such an assembly could be located on the opposite end of rod 21 or on both ends of rod 21.

A spring 43a of the spring and plunger assembly 43 in this case is held in compression by a plunger 43b that has an elongated shaft section over which the spring 43a fits and a larger diameter head section that serves as the biasing surface for one end of the spring. The end of the plunger 43b opposite the head section is formed with an aperture through which the end of the cable 27b is looped and then crimped to anchor the cable to the plunger.

In keeping with the invention, the drive member 33 consists of three adjacent cylindrical portions 33a, 33b and 33c which each have an annular surface (best shown in FIG. 5) dedicated to a particular function in effecting the reciprocating movement of the rod 21. A central portion 33a cradles the rod 21 and subtends the retaining mechanism composed of the plastic rollers 37a, 37b. Second and third portions 33b and 33c, respectively, of the drive member 33 are on opposite sides of the first portion 33a. The second and third portions 33b, 33c each has an outer diameter that tapers inwardly from the bearing surfaces 41a or 41b along the longitudinal axis of the drive member toward the first portion 33a. By providing such a tapered outer diameter, the cables 27a, 27b are guided to wind around the portions 33b, 33c, respectively, in a single layer. In order to anchor the cables 27a, 27b on the drive member 33, bore holes in the portions 33b, 33c adjacent the bearing surfaces 41a, 41b, respectively, receive ends of the coiled cables which are fitted with a crimp 45, as shown in FIG. 6, to prevent the end from withdrawing from the bore.

As an alternative to the spring and plunger assembly 43 shown in FIG. 4, a spring 47 under tension, as shown in FIG. 7, can join the looped end of the cable 27b to an outrigger 49 of the rod 21. As with the spring and plunger assembly 43, the spring 47 takes up slack in the cables 27a, 27b and prevents excessive tensioning the cables. In a manner similar to that of FIG. 4, an outrigger 51 connects the end of the rod 21' to the L bracket 29 for relative pivotal movement.

From the foregoing, it can be seen that the apparatus of the present invention provides reciprocating motion to open or close windows, vents or the like through a plurality of mechanisms that may be ganged on a single shaft and yet be individually adjustable or removable. Moreover, each mechanism has a minimum of moving parts and thereby lends itself to economical manufacture and easy and reliable use.

We claim as our invention:

1. A control mechanism for opening and closing a window sash or like element pivotally mounted in a frame, said control mechanism comprising:
    a drive shaft mounted for rotation about the longitudinal axis of said shaft;
    means responsive to command signals for rotating said drive shaft in clockwise or counterclockwise rotation;
    a drive member mounted on and coaxial with said drive shaft;
    an elongated rod directly contacting at its central area the surface of said drive member such that clockwise and counterclockwise rotation of said drive shaft and said drive member causes reciprocal movement of said elongated rod along the longitudinal axis of said rod in directions transverse to the longitudinal axis of said drive shaft;
    a housing member for maintaining said elongated rod in direct contact with said drive member such that said elongated rod and said housing member are free to rotate about the longitudinal axis of said drive shaft;
    said elongated rod having a first end secured to said window sash such that longitudinal movement of said rod in a first direction in response to rotation of said drive shaft and said drive member results in the opening of said window sash and longitudinal movement of said rod in a second and reverse direction in response to rotation of said drive shaft and said drive member results in the closing of said window sash, with said housing member and rod in each case rotating about the axis of said drive shaft as the window sash pivots about said frame; and
    said drive member including first, second and third cylindrical portions wherein each portion is annular in shape and wherein said first portion cradles said rod and said second and third portions are on opposite adjacent sides of said first portion for winding and unwinding cable means associated with said rod as an incident to rotation of said drive shaft and drive member.

2. A control mechanism as set forth in claim 1 wherein said cable means includes a first cable connecting the first end of said rod with the second portion of said drive member and a second cable connecting the second end of said rod with the third portion of said drive member.

3. A control mechanism as set forth in claim 2 wherein said second and third portions of said drive member have outer diameters which taper along the axis of rotation of said member from the cylindrical ends of said member toward the first portion centrally located between said second and third portions such that rotation of said drive member winds or unwinds said cable guide means without overlapping of said cable on said second or third portions.

4. A control mechanism as set forth in claim 1 wherein said drive member includes a central hollow portion for receiving said drive shaft.

5. A control mechanism as set forth in claim 4 wherein said drive member comprises two half cylinder portions which are joined to said drive shaft by positioning the two halves on opposite sides of the drive shaft and joining the two halves by coupling means.

6. A control mechanism as set forth in claim 1 wherein said drive member includes a first portion defining an annular ring about the outer surface of said member for receiving said rod, and said first portion being adapted for limiting the lateral movement of said rod to said member.

7. A control mechanism as set forth in claim 6 wherein said rod is cylindrical and said first portion has a concave outer profile for receiving said cylindrical rod in nested engagement therein.

8. A control mechanism for opening and closing a window sash or like element which is pivotally mounted in a frame element, the control mechanism comprising:
    a drive member fixedly mounted on a drive shaft for clockwise and counterclockwise rotation with said shaft about an axis of rotation;
    a housing mounted on the drive member and including a retainer means;
    said drive member having a first portion that subtends said retainer means, said drive member further being formed with second and third cable receiving portions;
    a window operating rod located between said first portion and said retainer means such that said rod is held in direct contact with said first portion, said rod being adapted for reciprocating longitudinal movement with respect to said drive member in response to the rotational movement of said drive member such that said longitudinal movement is orthogonal to said axis of rotation and said rod having a first end connected to the window sash;
    cable means for drivingly connecting said drive member and said rod;
    said cable means including a first cable secured to a second end of said rod and extending to said second portion of said drive members and being wound in a first direction around said second portion; and
    said cable means also including a second cable secured to said first end of said rod and extending to said third portion of said drive member and being wound in a second direction around said third portion.

9. A control mechanism as set forth in claim 8 wherein said cable means includes resilient means for preventing slack and over-tensioning in said cable means.

10. A control mechanism as set forth in claim 8 wherein said drive member is cylindrical and composed of two semi-cylindrical parts having a mating plane extending through the longitudinal axis of the cylinder formed by the drive member, and said control mechanism further includes fastening means for coupling together the two parts of the drive member whereby the drive member can be assembled around said drive shaft.

11. A control mechanism as set forth in claim 8 wherein said first portion describes an annular ring about the outer surface of said drive member for receiving said rod and limiting the lateral movement of said rod with respect to said drive member.

12. A control mechanism as set forth in claim 11 wherein said rod is cylindrical and said first portion has a concave outer profile for receiving said cylinder rod in nested engagement therein.

13. A control mechanism as set forth in claim 8 wherein said first, second and third portions are each annular in shape, and said first portion cradles said rod and said second and third portions are on opposite adjacent sides of said first portion for winding and unwinding said first and second cables of said cable means.

14. A control mechanism as set forth in claim 8 wherein said second and third portions of said drive member have outer diameters which taper from opposing ends of said drive member toward the first portion centrally located between said second and third portions such that rotation of said drive member winds or unwinds said cable means in a single layer of said first and second cables on said second or third portions, respectively.

15. A control mechanism as set forth in claim 8 wherein said drive member includes flanges at its opposing cylindrical ends which serve as bearing surfaces for rotation of said housing relative to said drive member.

16. A control mechanism for opening and closing a window sash or like element pivotally mounted in a frame element, said control mechanism comprising:
   a drive member mounted for rotation with an elongated drive shaft about an axis of rotation, said drive member having first, a second and third cylindrical portions;
   a housing mounted for rotation on said drive member and including a retaining mechanism proximate said first portion of said drive member such that said first portion subtends the retaining mechanism;
   an elongated rod located between said first portion of the drive member and the retaining mechanism of said housing such that the retaining mechanism holds the rod in contact with the first portion of said drive member, said rod being adapted for reciprocating longitudinal movement in response to rotation of said drive member such that said longitudinal movement is orthogonal to said axis of rotation, a first end of said rod being connected to said window sash;
   cable means for drivingly connecting said rod to said second and third portions of said drive member whereby rotation of said drive member in one direction causes longitudinal movement of said rod in one direction, thereby opening the window, and rotation of said drive member in a second direction causes longitudinal movement of said rod in a second direction, thereby closing the window.

17. A control mechanism as set forth in claim 16 wherein said drive member is cylindrical and includes a central hollow portion for receiving said drive shaft such that said drive member is concentric with said drive shaft.

18. A control mechanism as set forth in claim 17 wherein said drive member comprises two half-cylinder portions which are joined to said drive shaft by positioning the two halves on opposite sides of the drive shaft and joining the two halves by coupling means.

19. A control mechanism as set forth in claim 16 wherein said rod is cylindrical and said first portion has a concave outer profile for receiving said rod in nested relation so as to prevent lateral movement of the rod over the surface of said drive member.

20. A control mechanism as set forth in claim 16 wherein said first portion of said drive member cradles said rod and said second and third portions are adjacent said first portion on opposite sides thereof for winding and unwinding said cable means.

21. A control mechanism as set forth in claim 20 wherein said cable means includes a first cable connecting the first end of said rod with the second portion of said drive member and a second cable connecting the second end of said rod with the third portion of said drive member.

22. A control mechanism as set forth in claim 21 wherein said second and third portions of said drive member have outer diameters which taper from opposing cylindrical ends of said member toward the first portion centrally located between said second and third portions such that rotation of said drive member coils or uncoils said first and second cables in a single layer on said second or third portions.

23. A control mechanism as set forth in claim 16 wherein said drive member includes flanges at its opposing cylindrical ends which serve as bearing surfaces for rotation of said housing member relative to said drive member.

* * * * *